Dec. 27, 1966 E. CHAPMAN 3,293,908
PHOTOELASTIC MACHINE
Original Filed April 3, 1962 4 Sheets-Sheet 1

INVENTOR
Everett Chapman
BY
Synnestvedt & Lechner
ATTORNEYS

Dec. 27, 1966  E. CHAPMAN  3,293,908
PHOTOELASTIC MACHINE
Original Filed April 3, 1962  4 Sheets-Sheet 2

INVENTOR
Everett Chapman
BY
Synnestvedt & Lechner
ATTORNEYS

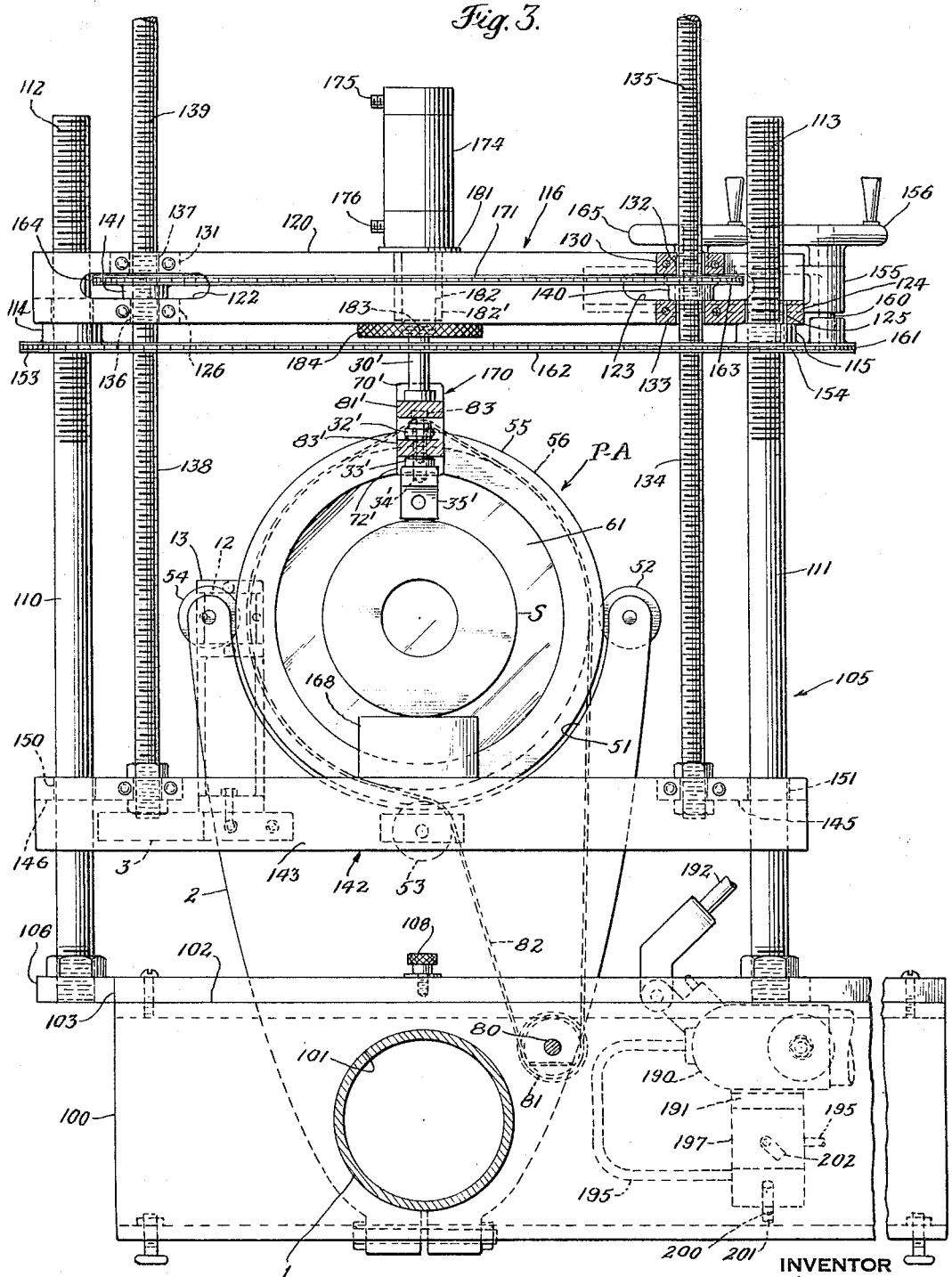

Dec. 27, 1966 E. CHAPMAN 3,293,908
PHOTOELASTIC MACHINE
Original Filed April 3, 1962 4 Sheets-Sheet 4
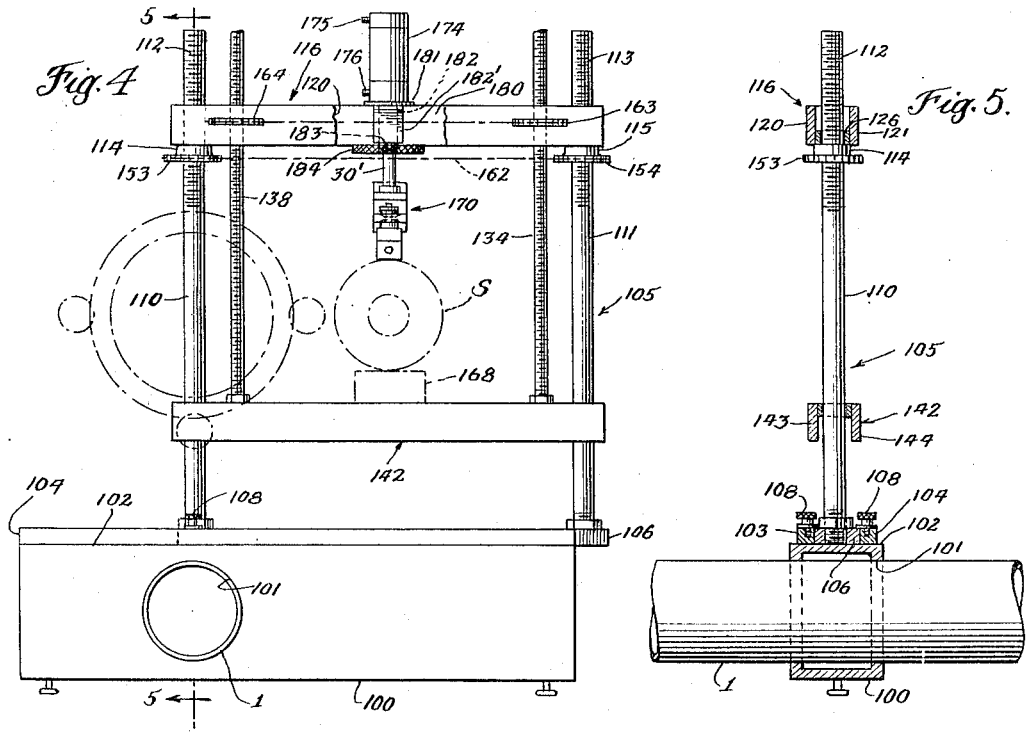
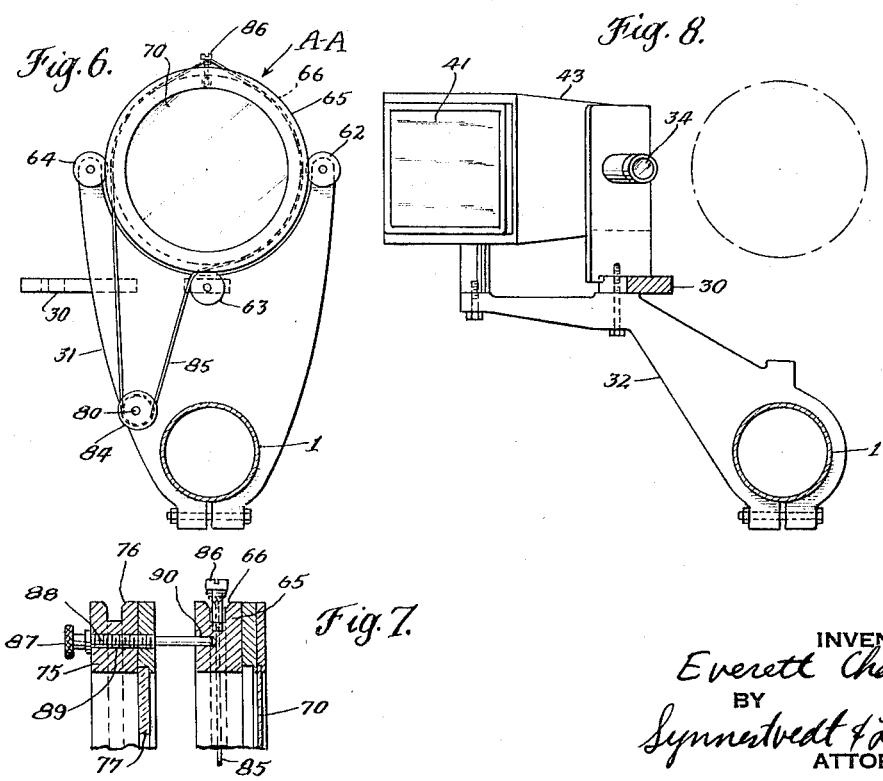
INVENTOR
Everett Chapman
BY
Synnestvedt & Lechner
ATTORNEYS United States Patent Office 3,293,908
Patented Dec. 27, 1966

3,293,908
PHOTOELASTIC MACHINE
Everett Chapman, P.O. Box 207,
West Chester, Pa. 18503
Continuation of application Ser. No. 184,827, Apr. 3, 1962. This application Aug. 21, 1964, Ser. No. 392,078
19 Claims. (Cl. 73—88)

This application is a continuation of my copending application Serial No. 184,827, filed April 3, 1962, now abandoned.

This invention relates to improvements in photoelastic equipment.

The usual photoelastic machine includes a source of light, polarizer and analyzer assemblies, viewing screen, appropriate collimating and field lenses together with means for mounting and loading a test specimen, the foregoing elements being disposed along a straight horizontal viewing axis with the light source at one end and the viewing screen at the other.

The present invention includes elements of the kind mentioned above but all being cooperatively arranged and constructed to provide a machine which has highly desirable functional and operational advantages over machines heretofore known.

In one aspect the invention contemplates an improved photoelastic machine having an operator's station located centrally of and on one side of the machine with the components of the machine being arranged so that the operator can simultaneously manipulate the machine controls and view the stress image form the central station.

In another aspect the invention contemplates an improved photoelastic machine having an optical axis arranged in zig-zag fashion and terminating in a viewing screen which can be observed from an operator's station located centrally of and on one side of the machine, the station including machine control elements for use in image forming.

In another aspect the invention contemplates a photoelastic machine having a hydraulic specimen loading or stressing system which incorporates a displacement-type weighing device through which the stress is transmitted to the specimen.

In another aspect, the invention contemplates a photoelastic machine having a sensitive displacement-type weighing device incorporated directly in the specimen stressing or loading system with the stressing forces being developed by hydraulic means arranged so that the stress can be applied in relatively small or large increments and is transmitted to the specimen through the weighing device.

In another aspect the invention contemplates a photoelastic machine including a frame having a pair of cross heads between which are mounted a specimen, a piston and cylinder assembly for applying a load to the specimen and a load weighing device with all of these components being arranged so that the force developed between piston and cylinder is taken by both the weighing device and the specimen.

In another aspect the invention contemplates an improved photoelastic machine having a specimen loading or stressing system including a hydraulic cylinder and piston for developing the loading force together with a U-shaped weighing device, one leg of which is connected to the piston and the other leg to one side of the test specimen, the weighing device simultaneously transmitting and measuring the load applied to the specimen.

In another aspect the invention contemplates a photoelastic machine having a scanning frame for holding a test specimen, the frame having a unitized construction so that the frame can be bodily moved toward and away from the optical axis of the machine.

In another aspect the invention contemplates a photoelastic machine having a polarizer and analyzer mounted to be simultaneously rotatable but arranged on the machine with an access space therebetween to accommodate motion of a specimen scanning frame toward and away from the optical axis.

In another aspect, the invention contemplates a photoelastic machine having a scanning frame constructed for providing two components of scanning motion, one motion being provided by bodily moving the whole frame toward and away from the optical axis and the other motion being provided by moving the specimen holding section of the frame in a vertical direction.

In another aspect, the invention contemplates a photoelastic machine wherein a scanning frame having a unitized construction is movable to a working position wherein a specimen mounted in the frame is within the optical field and movable away from the field to an inoperative and more accessible position where a specimen can be quickly inserted or removed without interference from any of the other parts of the machine.

In another aspect the invention contemplates an improved photoelastic machine having a scanning frame comprising a pair of vertically spaced cross heads together with means for moving the cross heads in unison in a vertical direction and means for moving the lower cross head relative to the upper cross head.

In another aspect the invention contemplates a photoelastic machine especially suited for split-fringe techniques in that the load can be applied in small increments and accurately measured while being applied and at the same time the analyzer can be independently rotated and the image viewed, the load application, the measurement, the rotation and the viewing all being accomplished from a central station.

A typical embodiment of the invention and the various advantages thereof will be apparent from the following description and drawings, wherein:

FIGURE 3 is an enlarged cross section taken on the line 3—3 of FIGURE 1 and illustrating in particular various of the structural details of the scanning frame and the specimen loading mechanism;

FIGURE 4 is a more or less diagrammatic view showing the position of the scanning frame when it has been moved to the position for inserting or removing a specimen;

FIGURE 5 is a cross section taken along the line 5—5 of FIGURE 4 and illustrating certain of the structural details of the upper and lower cross heads and the platform for movably mounting the scanning frame;

FIGURE 6 is a cross section taken along the line 6—6 of FIGURE 1 and illustrating in particular certain of the details of the mechanism for rotating the quarter-wave plate-analyzer assembly;

FIGURE 7 is a fragmentary cross section illustrating means for releasably locking the analyzer and quarter-wave plate and also the means for securing the quarter-wave plate-analyzer drive cable; and FIGURE 8 is a cross section taken on the line 8—8 of FIGURE 1 showing the viewing screen and housing.

The invention contemplates an improved machine arranged for the operator to be located in a central station or area wherein all of the various controls for the machine are actuable, the stress image can be viewed or photographed and the specimen can be inserted or removed from the machine.

One of the physical characteristics which provides for the central station concept is the arrangement of the optical axis. This is described following.

Figure 1:
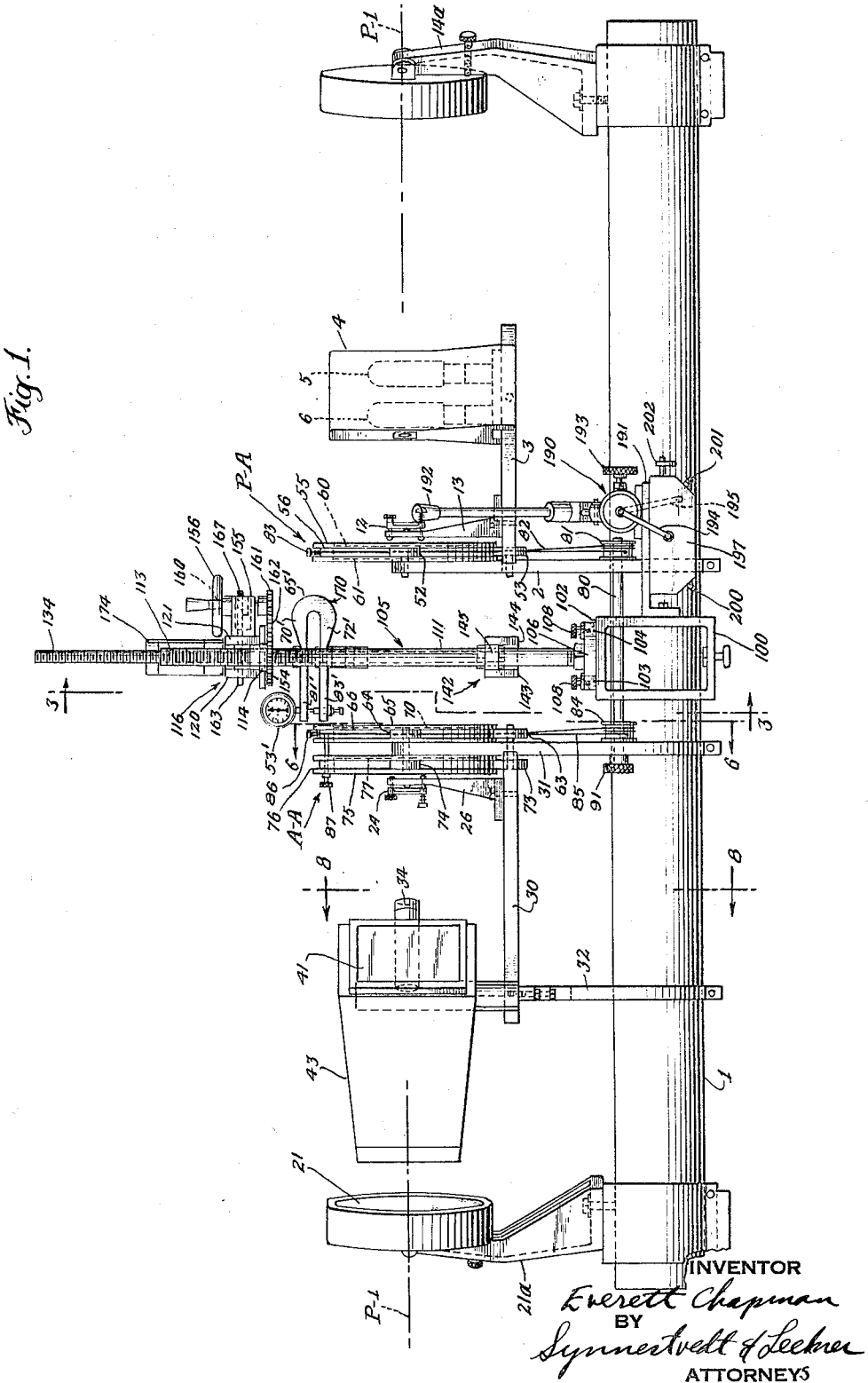
FIGURE 1 is a side elevational view of a photoelastic machine constructed in accordance with the invention.

Referring to FIGURE 1, the main support 1 for the machine is in the form of a tube. This makes for a rugged distortion-free support. As will be noted later, all of the elements of the machine are connected to the tube and this minimizes alignment problems. Located centrally of the main support or tube 1 is a generally triangular-shaped bracket 2 (see FIGURE 3) which mounts an arm 3. Disposed on the arm 3 is a housing 4 carrying the lights 5 and 6. Ordinarily one of the lights provides a source of white light while the other provides (with appropriate filtering) a source of monocromatic light. The housing is mounted on the arm 3 so that it may be turned 180° to bring either lamp into operating position. The light beam emanating from the housing is indicated by the dot and dash lines 10. The axis of the beam is indicated by the dot and dash lines 11.

The light beam 11 impinges on a flat mirror 12 which is adjustably mounted on the standard 13 supported by the arm 3. The mirror 12 reflects the light beam to a spherical mirror 14 mounted on an appropriately adjustable standard 14a adjacent one end of the tube 1. The light beam as between the flat mirror 12 and the spherical mirror 14 is indicated by the dot-dash lines 15 and the axis of the beam is indicated by the heavy dot and dash lines 16. The spherical mirror 14 projects a collimated beam 20 toward a spherical concave mirror 21 mounted on an appropriately adjustable standard 21a adjacent the other end of the tube 1. The axis of the beam 20 is indicated by the heavy dot-dash line 22; this is the main optical axis.

The spherical mirror 21 projects the beam indicated by the dot and dash lines 23 to a flat mirror 24. The axis of the beam is indicated by the heavy dot-dash line 25.

The flat mirror 24 is adjustably mounted on a standard 26 supported by an arm 30, one end of which is connected to a bracket 31 mounted on the tube 1. The other end of the arm 30 is mounted on a bracket 32 also supported by the tube 1.

The flat mirror 24 projects a beam indicated by the dot and dash lines 33 to a focusing lens 34 and thence to a flat mirror 35. The axis of the beam as between the flat mirror 24, through the lens 34 to the mirror 35 is indicated by the heavy dot and dash lines 36. The mirror 35 then reflects the beam 40 to an image receiving station which, as shown, is a translucent viewing screen 41. The axis of the beam 40 is indicated by the heavy dot-dash lines 42. The lens 34, mirror 35 and screen 41 are all supported by a housing 43 carried on the bracket 32. The screen 41 is the usual ground glass or Eastman Kodak's Ektalite screen.

The image on the screen 41 is viewed by an operator located in the area or central station designated by X.

Note that the mirror 35 reflects the beam through the housing at an acute angle which is acute to the axis 22 in a direction generally toward the station X (and the various controls located at the station).

Figure 2:
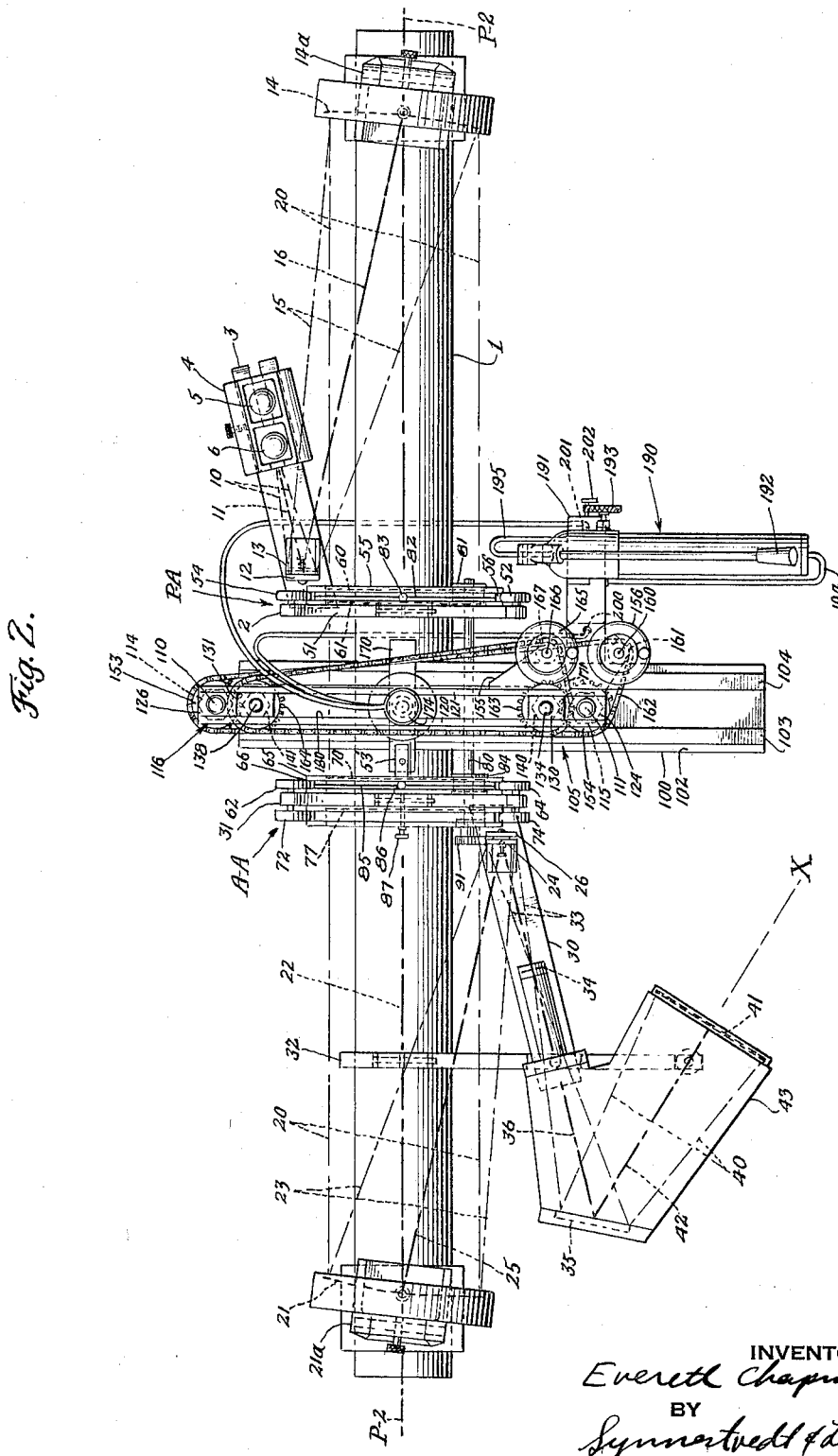
FIGURE 2 is a plan view of the machine of FIGURE 1.

The optical axis from the light source to the viewing screen is comprised of the heavy dot and dash lines 11, 16, 22, 25, 36 and 42. The mirrors 12, 14, 21 and 24 are each adjustable to direct the light as shown and to maintain the axes 11, 16, etc. in a single horizontal plane P-1 (FIGURE 1). With reference to FIGURE 2, it will be observed that a vertical plane P-2 contains the axis 22 (also the axis of the tube 1) and that the axes 11, 16, 22, 25, 36 and 42 are oriented transversely of plane P-2. Each of the mirrors 12, 14, 21, 24 and 35 are first surface type so that there is a minimum of refractive elements (lens 34) in optical path. For photographic work the focusing lens 34 is equipped with a shutter.

In connection with the above, it will be apparent that the optical axis (from light source to viewing screen) runs zig-zag. This is in direct contrast to the usual photoelastic machine where the optical axis from light source to viewing screen runs along a straight line.

If the optical axis described above were located along a straight line, its length would be approximately two to three times the length of the tube 1. This aspect of the invention has several important advantages.

First of all, the overall length of the machine is reduced. This, of course, is conducive to lower material costs in manufacturing. Additionally, a machine in a laboratory or in an industrial plant needs far less floor space than a machine having an equal straight optical axis.

The most important feature, however, of the arrangement is that it enables the operator to view the image while he simultaneously performs any of the usual functional techniques. The single station arrangement enhances the versatility of the machine both from a functional and from an operational standpoint.

The structure and location of certain of the other components of the machine for attaining the above-mentioned feature will be explained hereinafter. Before going on, however, it is pointed out that the housing 43 is arranged so that the viewing screen 41 can be equipped with an adaptor which carries photographic emulsions. Alternatively, an adaptor mounting a prism or mirror can replace the viewing screen 41. The prism or mirror will project the beam downwardly onto a flat table. The latter is particularly useful in instances where the various stress patterns in the image are to be traced on paper.

The invention contemplates that the polarizer assembly P-A and the analyzer assembly A—A be rotatable in unison from the central station. The invention also provides that these assemblies not only be rotatable in unison, but be physically separated to provide a space for the free movement of the scanning frame. The structure for accomplishing the foregoing will be described following.

As best seen in FIGURE 3, the bracket 2 has a circular cutout 51 and a plurality of rollers 52, 53 and 54 are rotatably mounted on the bracket adjacent the cutout area. Referring to FIGURES 1 and 2, the polarizer assembly P-A includes a ring-like member 55, the periphery of which is formed with a track 56. The track 56 mounts the ring on the rollers 52–54. The ring 55 carries the polarizer 60 and quarterwave plate 61, both of these being of conventional form. Referring to FIGURE 6, the bracket 31 is the same shape as the bracket 2 and carries a plurality of rollers 62, 63 and 64. The analyzer assembly (FIGURES 1 and 2) includes the ring-like member 65 formed with a peripheral track 66 which rotatably mounts the ring on the rollers 62–64. The ring 65 carries the quarterwave plate 70. The bracket 31 also carries three rollers 72–74 mounted on the same shaft as the rollers 62–64. A ring-like member 75 of the analyzer assembly has a peripheral track 76 which mounts the ring on the rollers 72–74. The ring 75 carries the analyzer 77.

The means for rotating the polarizer and analyzer assemblies from the central station is described following.

With reference to FIGURE 1, it will be seen that a shaft 80 rotatably supported in the brackets 2 and 31 is disposed substantially below the polarizer and analyzer assemblies. The right hand end of the shaft carries a pulley 81 and wound around the pulley is the cable 82 which extends upwardly (see FIGURE 3) over the pulley 53 and in the track 56 on the ring 55. A lock screw 83 holds one portion of the cable fast on the ring. As will be apparent, if the pulley 81 is rotated, the cable will cause the ring 55 to rotate, hence, rotating the polarizer and quarterwave plate. The other end of the shaft carries a pulley 84 and wound around the pulley 84 is a cable 85 which extends upwardly (see FIGURE 6) over the pulley 63 and into the track 66 on the ring 65. A lock screw 86 holds one portion of the cable fast on the ring 65. Rotation of the pulley 84 causes rotation of the ring 65 and its quarterwave plate 70.

The rotational motion of the ring 65 and quarterwave plate is transmitted to the ring 75 by means of a drive pin 87. The pin 87 (see FIGURE 7) has threads 88 which mate with threads 89 on the ring 75 and the end of the pin 87 extends into an aperture 90 provided in the ring 65. The end of pin 87 can be removed from the aperture 90 simply by turning the pin until the end is free. When the pin is free, the ring 75 and analyzer can be rotated independently of the ring 65 and quarterwave plate 70.

Adjacent the pulley 84 on the shaft 80 is a knob 91. The knob 91 turns the shaft 80, hence the pulleys 81 and 84 which cause the polarizer and analyzer assemblies to rotate.

It will be observed that the knob 91 is located substantially adjacent the viewing screen 41 and that an operator located at central station X could, say with his left hand, turn the knob 91 while simultaneously viewing an image on the screen 41. Note also, that with the drive pin 87 removed, the left hand, instead of moving the knob 91, can conveniently rotate the analyzer relative to the polarizer.

As will be apparent to those skilled in the art, the provision locating the operator at a central station for viewing the image while simultaneously rotating the polarizer-analyzer assemblies (or the analyzer alone) is important and useful in the various techniques for stress analysis.

With reference to FIGURES 1 and 2, it will be seen that the physical connections between the polarizer and analyzer assemblies is via the tube 1 and the shaft 80. These elements are located substantially below the assemblies so that both in elevation (FIGURE 1) and in plan (FIGURE 2) a large free space is provided. It will be observed that the foregoing is accomplished even though the polarizer and analyzer assemblies are physically interconnected for simultaneous rotation. As will be more apparent later, the foregoing is important from the standpoint of scanning and loading and unloading the specimen.

The invention provides for a scanning frame which is bodily movable in and out of the space between the polarizer and analyzer assemblies. The frame can be moved for a scanning operation and also can be moved toward the central station and spaced away from the other elements of the machine so that a specimen can be loaded or unloaded without interference. The structure of the scanning frame and the platform for mounting the frame will be described below.

With reference to FIGURES 1, 2 and 3 a generally rectangular-shaped platform 100 is disposed centrally of the tube 1. With reference to FIGURE 3, it will be seen that the platform 100 has an aperture 101 and that the tube 1 extends through the aperture. The tube 1 and the platform 100 are welded or otherwise fastened at the juncture to form a rigid unified structure.

The platform has a top surface 102 and on the top surface (FIGURE 5) are the guides 103 and 104. The top surface 102 together with the guides 103 and 104 constitute a means for movably mounting the scanning frame 105.

With reference to the foregoing structure, it should be observed that the platform is oriented at right angles to the axis of the tube 1 and that the platform and guides 103 and 104 extend at right angles to optical axis 22. Further, it will be observed that platform is offset with relation to the tube 1, and that is to say, that the platform extends on opposite sides of the tube 1, but with the extension on the central station side being greater than the extension on the opposite side.

The scanning frame 105 includes a base member 106 which rests on the surface 102 between the guides 103 and 104. Fixedly connected to opposite ends of the base 106 are the upright standards 110 and 111, the standard 110 being threaded at 112 and the standard 111 being threaded at 113. The standard 110 carries a nut 114 and the standard 111 carries a nut 115. The nuts 114 and 115 support an upper cross head generally designated by 116.

The upper cross head 116 includes the cross bar 120 which is disposed on one side of the standards 110 and 111 and rests on the nuts 114 and 115. The cross head also includes the cross bar 121 which is disposed on the opposite side of the standards 110 and 111 and also rests on the nuts 114 and 115. The cross bar 120 is provided with slots 122 and 123 and the cross bar 121 has identical aligned slots (not shown).

The cross bars 120 and 121 are interconnected by the retainers located adjacent the slots. As indicated in FIGURE 3 (right hand side), a lower retainer 124 has an aperture 125 which envelops the standard 111. A similar retainer 126 (on the left hand side) envelops the standard 110. The retainers 124 and 126 tie in the cross bars 120 and 121 and maintain the lateral stability of the upper cross heads. Above the slots are located the retainers 130 and 131.

The upper retainer 130 has an aperture 132 and the retainer 124 (below the retainer 130) has an aperture 133. The apertures 132 and 133 accommodate the rod 134. The rod 134 has threads 135. On the left hand side, the retainers 126 and 131 have apertures 136 and 137 through which extend the rod 138. The rod 138 is threaded as indicated at 139.

Disposed on rods 134 and 138 are the nuts 140 and 141. The lower retainers 124 and 126 slidingly engage the undersides of the nuts 140 and 141 and the upper retainers 130 and 131 are in sliding engagement with the tops of the nuts. The apertures 132, 133 in the right hand retainers 124 and 130 and the apertures 136 and 137 in the left hand retainers 126 and 131 maintain the rods 134 and 138 against lateral displacement but provide for the rods to be axially movable in a vertical direction.

The rods 134 and 138 support the lower cross head 142 which comprises a pair of cross bars 143 and 144 similar to the cross bars 120 and 121. The cross bars 143 and 144 are connected to the rods 134 and 138 by the retainers 145 and 146. These retainers have construction similar to the retainers 124 and 126. The retainers 145 and 146 have apertures 150 and 151 which envelop the standards 110 and 111 and maintain the transverse stability of the lower cross head.

The upper and lower cross heads can be moved in unison in a vertical direction or the lower cross head can be moved relative to the upper cross head in a vertical direction. The structure for accomplishing the foregoing is explained below.

As to both cross heads: The nuts 114 and 115 have sprockets 153 and 154 (FIGURE 2). A bracket 155 mounted on the cross bar 121 carries a hand wheel 156 fixed to a rotatable shaft 160 (FIGURE 3) carrying a sprocket 161. A chain 162 is threaded over the sprocket 161 and the sprockets 153 and 154 on the nuts 114 and 115. When the hand wheel 156 is rotated, the nuts 115 and 114 will be simultaneously rotated and will creep along the standards 110 and 111 carrying along the upper and lower cross heads.

As to the lower cross head: The nuts 140 and 141 carry sprockets 163 and 164. A hand wheel 165 has a shaft 166 mounting a sprocket 167. A chain 171 fits over the sprocket 167 and the sprockets 163 and 164 on the nuts 140 and 141. When the hand wheel 165 is rotated, the nuts 143 and 144 are simultaneously rotated and consequently move the threaded rods 134 and 138 and the lower cross head.

The invention contemplates that one side of the specimen to be tested be held on the lower cross head and that the other side of the specimen be connected with the upper cross head via the stress or load applying means. The cross heads themselves do not apply the load to the specimen, but, in essence, are reaction members for the specimen and the means for applying the load to the specimen.

In FIGURE 3, the bottom of the specimen S is supported or held on a block 168 which straddles the lower cross bars 143 and 144. A bracket 35' is engaged with the top of the specimen. The bracket 35' is interconnected to a sensing device 170, which in turn is connected to a piston rod 30' connected to a piston in the cylinder 174. The piston in the cylinder 174 is a double acting type and fluid in the connections 175 and 176 determines the direction of piston motion. In the particular arrangement shown, fluid enters the connection 175 and exits through 176 so that the piston is moved down to exert a compressive load on the specimen. In connection with the mounting of the specimen between the cross heads 116 and 142, the hand wheel 165 is used to adjust the lower cross head to accommodate the size and shape of the specimen.

In photoelastic work it is often times necessary to scan the specimen; i.e., to move the specimen relative to the light beam while the specimen is under stress. This is necessary for example in those instances where the size of the specimen is larger than the cross sectional area of the light beam and all parts of the specimen must be brought within the beam for examination. The above described structure provides a means for moving the specimen both horizontally and vertically and any part of the specimen in a desired position. The horizontal component is provided by moving the whole scanning frame along the surface 102 of the platform and the vertical component provided by moving the two cross heads with the hand wheel 156.

In a scanning operation, the thumb screws 108 are loosened and the frame moved horizontally along the platform to the desired position. Then the hand wheel 156 is actuated which moves the upper and lower cross heads and specimen in a vertical direction.

It will be observed that the frame is moved horizontally and the cross head moved vertically when the operator is in the central station position X. For moving the frame either or both hands may be used to unloosen the thumb screws 108 and either or both hands used to grasp the frame, say at the standard 111, and slide the same along the platform. The foregoing is accomplished while viewing the image in the screw 41. Ordinarily, the right hand is used to manipulate the hand wheel 156 and this is done while viewing the image in the viewing screen. Horizontal and vertical adjustments can be made to pose any selected area of the specimen on the screen. The ability to scan and view simultaneously is highly desirable because it makes scanning a very fast and highly accurate operation.

With regard to moving the frame all the way over to the side opposite the central station, it will be noted that the platform extends outwardly from the tube 1 so that the viewing screen is adequately supported even when moved over to a point where the rod 134 is closely adjacent the optical axis 22. In addition to the scanning feature mentioned above, the invention contemplates that the frame be movable to an accessible position where a specimen can be inserted or removed without interference from other elements in the machine. How this is accomplished is explained below.

In FIGURE 3, the scanning frame is substantially symmetrically disposed about the optical axis 22 and in this position the frame may be said to be in the work position. In the work position, it would be rather awkward to insert a specimen in the frame because of interference by the polarizer and analyzer assemblies. When it is desired to insert a specimen (or to remove a specimen) the scanning frame is moved outwardly along the platform to the position indicated in FIGURE 4. In this position, it will be observed that the frame 105 is substantially spaced away from the optical axis and very close to the central station X. Also, the space between the upper and lower cross heads is free from obstruction by any other parts of the mechanism. This position of the frame 105 enables the operator to have complete freedom of action for inserting and removing specimens.

The invention contemplates that a load sensing or weighing device be an integral part of the specimen loading applying system. For this purpose, the invention utilizes a U-shaped weighing device which is described in detail in my copending application 184,790, filed April 3, 1962 now U.S. Patent No. 3,151,693 and entitled Weighing Devices and the disclosure of that application is incorporated herein by reference. The weighing device 172 herein is the same as the embodiment shown and described in connection with FIGURE 2 in said application. Reference may be had to this application for structural details, suffice it to say at this point, that the device comprises a loop section 65', leg sections 70' and 72', amplifying arms 81' and 83' and measuring device 53' which is a dial indicator. As shown in FIGURE 3, the leg 70' and amplifying arm 81' are connected to the piston rod 30' and the leg 72' and arm 83' are connected to the bracket 35' via the semi-spherical members 32' and 33' mounted in the stud 34' threaded in bracket 35'. Incidentally, the parts identified by numbers 30', 31', 32', 33', 34', 35', 53', 65', 70', 72', 83' and 86' are the same as the parts having the same numbers without primes in said application.

The cylinder 174 and the upper cross head 120 are constructed so that the cylinder may be moved along the cross head as between the rods 134 and 138. This feature is highly desirable because it extends the usefulness of the apparatus where the type of specimen to be investigated requires an unsymmetrical load application.

For the above purposes, the space between the cross bars 120 and 121 is open. The space is designated by 180. The cylinder 174 has a base 181 which extends over and rests on the tops of the cross bars 120 and 121. Secured to the base 181 is an extension 182 which extends down into the space 180. The end of the extension 182 is threaded at 183. The threaded portion carries a nut 184. The nut can be tightened so that it bears on the bottom of the cross beams 120 and 121 and will lock the cylinder 174 in some desired adjusted position. The piston rod 30' extends down through an appropriate aperture in the extension 182. The width of the extension 182 is substantially the same as the distance between the cross beams 120 and 121 so that the extension makes a sliding fit with the cross beams.

In connection with loading the specimen, the invention contemplates a weighing device of the type mentioned in combination with a hydraulic loading system.

The hydraulic jack for the loading system is generally indicated by the numeral 190 and is secured to a bracket 191 fastened to a platform 100. The jack is of a conventional design and need not be described in detail, suffice it to say, that the jack has a loading handle 192 and a bleeder knob 193. Fluid connections 194 and 195 run from the jack to a valve 197. The connections 200 and 201 on the valve run respectively by flexible lines (FIGURE 2) to the fluid connections 175 and 176 on the cylinder 174. The valve has a shift knob 202. The valve is of conventional design and need not be explained in detail, suffice it to say that when the shift knob is in one position, the valve will cause fluid to flow into the connection 175 and out of the connection 176 so that the piston in the cylinder 174 moves downwardly and when the knob 202 is in another position, fluid flows into the connection 176 and out of the connection 175 so that the piston moves upwardly.

With reference to FIGURE 2, it will be observed that the handle 192 for operating the jack can be easily manipulated by an operator located at the central station X. With reference to FIGURE 1, it will be seen that the dial indicator 53' is arranged so that it faces the operator whereby he can visually observe the total amount or the increments of load being applied to the specimen. Additionally, while the operator is applying load, he can view the change in image pattern in the screen 41.

I have found the combination of a hydraulic loading system and a U-shaped weighing device to be desirable because it provides for a relatively high maximum load range while at the same time providing for the load to be applied and measured in very small increments. Extending the load range is important because it increases the ability of the machine to perform tests on a wide variety of types and shapes of specimens. In addition, the combination ideally suits the machine for split fringe techniques.

The split fringe technique requires an independently rotatable analyzer and as explained heretofore, the analyzer 77 can be independently rotated while the operator is in the central control station. The ability to apply and measure (or view) small increments of load into a high range while independently rotating the analyzer (and all accomplished from the central control station) makes the machine a sophisticated and delicate instrument of maximum versatility.

I claim:
1. In a photoelastic machine:
   an elongated support;
   a light source connected with said support for projecting light toward a vertical plane;
   a first flat mirror connected with said support to receive light from said source and to reflect the same toward said plane;
   a concave spherical mirror connected with said support to receive light from said first flat mirror to collimate and project the light along an axis which lies in said plane;
   a polarizer rotatably mounted on said support and adapted to transmit said collimated beam;
   an analyzer rotatably mounted on said support and adapted to transmit said collimated beam;
   a second spherical concave mirror connected with said support and adapted to receive light transmitted by said analyzer and to reflect the same in a direction away from said plane;
   a second flat mirror connected with said support and adapted to receive the reflected light from said second spherical mirror and reflect the same away from said plane;
   a focusing lens connected with said support and adapted to transmit reflected light from said second flat mirror;
   a third flat mirror connected with said support and adapted to receive light from said focusing lens, each of said flat and said spherical mirrors being the first surface type;
   an image receiving station connected with said support and adapted to receive light from said third flat mirror;
   a platform disposed between said polarizer and said analyzer and connected to and extending at right angles to said support; and
   a scanning frame for mounting a test specimen slidably mounted on said platform for movement between said polarizer and analyzer in a direction normal to said plane.

2. A construction in accordance with claim 1 further including:
   a cylinder mounted on the scanning frame and having a piston movably mounted therein, the piston being for use in imposing a load on a test specimen mounted in the frame;
   a hydraulic jack mounted on said platform on the viewing screen side theerof; and
   connections between said jack and said cylinders, including a valve for controlling the transfer of fluid as between the jack and cylinder for controlling piston motion.

3. A construction in accordance with claim 2 further including means to simultaneously rotate in correct optical relation said polarizer and said analyzer including a control knob disposed on said viewing screen side.

4. A construction in accordance with claim 2 wherein said scanning frame has a pair of cross heads with the cylinder connected to one of the cross heads and the other having means for holding a test specimen, and further including means for moving the cross heads in unison on the frame and means for moving one cross head relative to the other, both of last said means including hand wheels located on said viewing screen side.

5. In a photoelastic machine, the sub-combination comprising:
   an elongated support;
   a first bracket mounted on said support;
   a first set of rollers mounted on said first bracket;
   a first ring-like member formed with a peripheral track, the track providing for rotatably mounting the ring in the rollers;
   a polarizer mounted on said first ring;
   a quarterwave plate mounted on said first ring;
   a second bracket mounted on said support;
   a second set of rollers mounted on said second bracket;
   a second ring-like member formed with a peripheral track, the track rotatably mounting the second ring on the second set of rollers;
   a quarterwave plate mounted on said second ring;
   a third set of rollers mounted on said second bracket;
   a third ring-like member formed with a peripheral track, the track rotatably mounting the ring in the third set of rollers;
   an analyzer on said third ring;
   a pin removably mounted on said second and third rings and providing for simultaneous rotation thereof;
   a shaft extending between and rotatably mounted on said brackets;
   a first pulley on said shaft and disposed below said first ring;
   a cable around said pulley and extending upwardly and around said track on said first ring;
   means fixing the cable to said first ring;
   a second pulley mounted on said shaft and disposed below said second ring;
   a second cable around said second pulley and extending upwardly and over said second ring;
   means fixing the second cable to the second ring; and
   a knob for rotating said shaft, rotation of the shaft causing simultaneous rotation of said pulleys, cables and rings.

6. A construction in accordance with claim 5 further including a platform connected to and extending at right angles to said support, the platform being in offset relation with respect to the support and said shaft being located on the offset side of the support.

7. In a photoelastic machine, the sub-combination comprising:
   an elongated tubular support;
   a rectangular-shaped, elongated platform connected to and oriented at right angles to said support, the platform having a slide surface;
   mechanism on said support rotatably mounting a polarizer;
   mechanism on said support rotatably mounting an analyzer, said mechanism separating the polarizer and analyzer to provide for an access space between the same and above said slide surface; and
   a scanning frame mounted on said slide surface for reciprocating motion within said access space in a direction generally normal to said support.

8. A construction in accordance with claim 7 wherein said platform extends on opposite sides of said support with the extension on one side being greater than the extension on the other.

9. For a photoelastic machine, a scanning frame comprising:
   a base;
   a pair of upright standards fixed to the base respectively adjacent opposite ends thereof, the top portion of each standard being threaded;

a first pair of nuts respectively mounted on said threaded portions of the standards;
a first cross bar engaged with the top side of each said nut, the cross bar being on one side of said standards;
a second cross bar engaged with the top side of said nuts and the second cross bar being on the opposite side of said standards, each cross bar being formed with a pair of slots respectively adjacent the ends of the bar and corresponding slots being aligned;
a second pair of nuts, each nut being disposed between the cross bars respectively adjacent said aligned slots;
for each said second nut, retainer means making a sliding fit with the bottom of the nut and extending between and connecting the cross bars and respectively surrounding said standards to confine the cross bars against lateral displacement but providing for movement of the cross bars along the axes of the standards;
a pair of threaded rods respectively connected with said second nuts;
for each said second nut, retainer means located on the top of the nut and surrounding its threaded rod and connecting the cross bars together and confining the nut and its rod against lateral displacement but providing for axial movement of the rods relative to the nuts;
a lower cross head connected to the bottom of said rods; and
means connected with said lower cross head and surrounding each of said standards and confining the lower cross head against lateral displacement but providing for movement of the lower cross head along the axes of said standards.

10. A photoelastic machine comprising:
an elongated support;
an elongated platform connected to and extending at right angles to said support;
mechanism on said support rotatably mounting a polarizer;
mechanism on said support rotatably mounting an analyzer,
said mechanisms physically separating the polarizer and analyzer to provide an access space between the same and above said platform;
a scanning frame for supporting a specimen, the frame being mounted on said platform for reciprocating motion within said access space in a direction generally normal to said support;
a source of light connected with said support;
an image viewing station connected with said support; and
means to project light from said source to said station including mechanism projecting the light along a straight axis through said polarizer and analyzer and thence a mirror adjacent said viewing station and oriented to reflect the light to the station at an angle which is acute to said straight axis in a direction towards said platform.

11. In a photoelastic machine:
an elongated support;
an assembly comprising a polarizer and a quarterwave plate rotatably mounted on said support;
an analyzer mounted on said support and spaced from said assembly;
a quarterwave plate rotatably mounted on said support closely adjacent said analyzer;
means connected between the quarterwave plate and analyzer and providing for the quarterwave plate to be rotatable independently of the analyzer or for the quarterwave plate and analyzer to be rotatable in unison;
means connected with said assembly and said analyzer for simultaneously rotating the same;
a scanning frame disposed between said assembly and said analyzer;
piston-cylinder means on said frame, the piston-cylinder means being for developing specimen stressing force;
controllable means for supplying fluid to said piston-cylinder means; and
a U-shaped weighing device, one leg of which is connected to said piston and the other leg having means for connecting the leg to a test specimen.

12. In a photoelastic machine:
an elongated support;
a platform connected to the central part of and extending at right angles to at least one side of said support;
an assembly comprising a polarizer and a quarterwave plate rotatably mounted on said support on one side of said platform;
an analyzer spaced from said assembly and rotatably mounted on said support on the other side of said platform;
a quarterwave plate rotatably mounted on said support closely adjacent said analyzer;
means connected between the quarterwave plate and analyzer and providing for the quarterwave plate to be rotatable independently of the analyzer or for the quarterwave plate and analyzer to be rotatable in unison;
manually operable drive means connected with said assembly and said analyzer for simultaneously rotating the same, the drive means having an operating knob located on said one side adjacent said platform;
a scanning frame slidably mounted on said platform;
piston-cylinder means on said frame, the piston-cylinder means being for developing specimen stressing force;
means including a manually operated control for supplying fluid to said piston-cylinder means, the control being located on said one side adjacent said platform;
a U-shaped weighing device, one leg of which is connected to said piston and the other leg having means for connecting the leg to a test specimen;
a source of light connected with said support;
an image receiving station connected with said support and located on said one side adjacent said platform; and
means to project light from said source to said station including mechanism projecting the light along a straight axis through said polarizer and analyzer and a mirror adjacent said image receiving station and oriented to reflect the light to the image receiving station at an angle which is acute to said straight axis in a direction towards said platform.

13. In a photoelastic machine:
an elongated support;
a light source connected with said support for projecting light toward a vertical plane;
a first flat mirror connected with said support to receive light from said source and to reflect the same toward said plane;
a concave spherical mirror connected with said support to receive light from said first flat mirror to collimate and project the light along an axis which lies in said plane;
a polarizer rotatably mounted on said support and adapted to transmit said collimated beam;
an analyzer rotatably mounted on said support and adapted to transmit said collimated beam;
a second spherical concave mirror connected with said support and adapted to receive light transmitted by said analyzer and to reflect the same in a direction away from said plane;
a second flat mirror connected with said support and adapted to receive the reflected light from said second spherical mirror and reflect the same away from said plane;

a focusing lens connected with said support and adapted to transmit reflected light from said second flat mirror;

a third flat mirror connected with said support and adapted to receive light from said focusing lens, each of said flat and said spherical mirrors being the first surface type;

an image receiving station connected with said support and adapted to receive light from said third flat mirror;

a platform disposed between said polarizer and said analyzer and connected to and extending at right angles to said support;

a scanning frame for mounting a test specimen slidably mounted on said platform for movement between said polarizer and analyzer in a direction normal to said plane;

a cylinder mounted on the scanning frame and having a piston movably mounted therein, the piston being for use in imposing a load on a test specimen mounted in the frame;

a hydraulic jack mounted on said platform on the viewing screen side thereof;

connections between said jack and said cylinders, including a valve for controlling the transfer of fluid as between the jack and cylinder for controlling piston motion; and a U-shaped weighing device, one leg of which is connected to said piston and the other leg having means for securing the same to a test specimen.

14. In a photoelastic machine:
an elongated support;
a polarizer rotatably mounted on said support;
an analyzer rotatably mounted on said support, the polarizer and analyzer being located along a straight axis;
a light source spaced from said axis and connected with said support for projecting light at an acute angle to said axis and toward said polarizer;
a first flat mirror spaced from said axis and connected with said support adjacent said polarizer to receive said light from said source and to reflect the same at an acute angle toward said axis in a direction away from said polarizer;
a concave spherical mirror connected with said support to receive light from said first flat mirror to collimate and project the light along said straight axis through said polarizer and analyzer;
a second spherical concave mirror connected with said support and adapted to receive said light transmitted by said analyzer and to reflect the same at an acute angle to said axis in a direction toward said analyzer;
a second flat mirror spaced from said axis and connected with said support adjacent said analyzer to receive the reflected light from said second spherical mirror and reflect the same at an acute angle away from said axis and away from said analyzer;
a focusing lens spaced from said axis connected with said support and adapted to transmit reflected light from said second flat mirror;
a third flat mirror spaced from said axis and connected with said support and adapted to receive light from said focusing lens and reflect the same at an acute angle away from said axis;
an image receiving station spaced from said axis and connected with said support and adapted to receive light from said third flat mirror; and
a scanning frame platform disposed between said polarizer and said analyzer and connected to and extending outwardly from said support on the same side of said support as said image station.

15. For a photoelastic machine, a scanning frame comprising:
a base;
a pair of upright standards fixed to the base respectively adjacent opposite ends thereof, the top portion of each standard being threaded;
a first pair of nuts respectively mounted on said threaded portions of the standards for movement therealong;
an upper cross head engaged with each said nut, the engagement supporting the cross head and providing for movement of the cross head with the nuts;
a second pair of nuts respectively rotatably mounted on said cross head;
a pair of threaded rods respectively connected with said second nuts and extending downwardly toward said base;
a lower cross head connected adjacent the bottom of said rods;
means connected with said lower cross head and surrounding each of said standards and confining the lower cross head against lateral displacement but providing for movement of the lower cross head along the axes of said standards;
means to move said second pair of nuts to move said rods and said lower cross head to vary the spacing between the upper and lower cross heads; and
means to move said first pair of nuts along the standards to adjust the upper and lower cross heads and threaded rods in a vertical direction.

16. A construction in accordance with claim 15 further including sprocket means on each said nut, a first drive chain on the sprockets of said first pair of nuts, means on the upper cross head to move the chain, a second drive chain on the sprockets of said second pair of nuts, and means on the upper cross head to move the second chain.

17. For a photoelastic machine, a scanning frame comprising:
a base;
a pair of upright standards fixed to the base;
an upper cross head extending between said standards;
a pair of rods respectively connected with said cross head and extending downwardly toward said base;
a lower cross head connected adjacent the bottom of said rods;
first support means respectively connecting said rods with said upper cross head and providing for the rods to be moved to a plurality of positions with respect to the upper cross head so as to vary the spacing between the upper cross head and the lower cross heads;
means connected with said lower cross head and surrounding each of said standards and confining the lower cross head against lateral displacement but providing for movement of the lower cross head along the axes of said standards; and
second support means respectively connecting the upper cross head with said standards and providing for the upper cross head, the rods and the lower cross head to be moved in unison to a plurality of positions along the standards.

18. A photoelastic machine comprising:
a platform;
mechanism adjacent said platform rotatably mounting a polarizer;
mechanism adjacent said platform rotatably mounting an analyzer, said mechanisms physically separating the polarizer and analyzer to provide an access space between the same and above said platform;
a scanning frame for supporting a specimen, the frame being disposed in said access space and mounted for reciprocating movement on said platform;
a source of light;
an image viewing station adjacent said platform;
means to project light from said source to said image viewing station including mechanism projecting the light along an axis through said polarizer and analyzer and thence to a focusing lens and to a mirror adjacent said viewing station, the mirror being oriented to reflect the light to the viewing station at an angle which is acute to said axis in a direction toward said platform; and opaque housing means supporting and surrounding said focusing lens, said mirror and said viewing station, the housing means being for use in blocking incident light when the viewing station is provided with means carrying a photographic emulsion.

19. A photoelastic machine comprising:

mechanism rotatably mounting a polarizer;

mechanism rotatably mounting an analyzer, said mechanisms physically separating the polarizer and analyzer to provide an access space therebetween;

a scanning frame for supporting a specimen, the frame being disposed in said access space for reciprocating motion;

a source of light;

an image receiving station;

means to project light from said source to said image station including mechanism projecting the light along an axis through said polarizer and analyzer and thence to a focusing lens and to a mirror adjacent said image station, the mirror being oriented to reflect the light at an acute angle to said axis toward a plane containing the path of motion of said scanning frame to the image station; and opaque housing means supporting and surrounding said focusing lens, said mirror and said image station, the housing means being for use in blocking incident light when the image station is provided with means carrying a photographic emulsion.

References Cited by the Examiner

UNITED STATES PATENTS

| | | | |
|---|---|---|---|
| 1,808,274 | 6/1931 | Webster | 88—24 |
| 2,096,964 | 10/1937 | Frocht | 88—14 |
| 2,730,007 | 1/1956 | Chapman | 88—14 |

OTHER REFERENCES

General Radio Experimenter, volume 25, No. 1, June 1950, article on pp. 3–7.

RICHARD C. QUEISSER, *Primary Examiner.*

G. M. GRON, *Assistant Examiner.*